United States Patent [19]

Butcher et al.

[11] Patent Number: 5,501,556
[45] Date of Patent: Mar. 26, 1996

[54] RETRACTABLE GUIDE ASSEMBLY FOR CHANGING THE EFFECTIVE WIDTH OF A RAILROAD FREIGHT CAR CONTAINER WELL

[76] Inventors: Ronald S. Butcher, 607 Geneva Park Drive, Burlington, Ontario; James W. Forbes, 485 Red River Drive, Waterloo, Ont., both of Canada, L7N 3C2

[21] Appl. No.: 414,085

[22] Filed: Mar. 31, 1995

Related U.S. Application Data

[62] Division of Ser. No. 225,383, Apr. 8, 1994.

[51] Int. Cl.$^6$ .............................. B60P 1/00; B61D 45/00
[52] U.S. Cl. .............................. 410/94; 410/121; 105/355
[58] Field of Search .............................. 410/121, 54, 94, 410/52, 153, 71, 56; 105/355, 404, 411, 374

[56] References Cited

U.S. PATENT DOCUMENTS

| | | | |
|---|---|---|---|
| 4,599,949 | 7/1986 | Hill | 105/355 |
| 4,718,353 | 1/1988 | Scheller et al. | |
| 4,754,709 | 7/1988 | Gramse et al. | 410/94 X |
| 4,771,706 | 9/1988 | Lindauer et al. | 410/52 X |
| 4,807,722 | 2/1989 | Jamrozy et al. | 410/78 X |
| 4,826,371 | 5/1989 | Brown | |
| 4,867,622 | 9/1989 | Brown | |
| 4,909,157 | 3/1990 | Jamrozy et al. | 410/56 X |
| 4,930,426 | 6/1990 | Saxton et al. | 410/94 X |
| 5,000,633 | 3/1991 | Kowalik et al. | 105/355 X |
| 5,017,066 | 5/1991 | Tylisz et al. | 410/121 |
| 5,308,202 | 5/1994 | Tatina | 410/94 |

*Primary Examiner*—Michael S. Huppert
*Assistant Examiner*—Stephen Gordon
*Attorney, Agent, or Firm*—Vidas, Arrett & Steinkraus

[57] ABSTRACT

A retractable guide assembly for changing the effective width of a container well of a railroad freight car includes a housing having a pair of spaced apart walls, each having an inverted U-shaped slot, and a guide for slidably mounted between the walls for translational movement relative to the housing. The guide is slidable between a retracted position and an extended position in which a portion of the guide projects beyond the housing. The guide has a bar for extending through each slot of the walls for travelling therealong in a cam relationship as the guide slides between the retracted position and extended position.

8 Claims, 12 Drawing Sheets

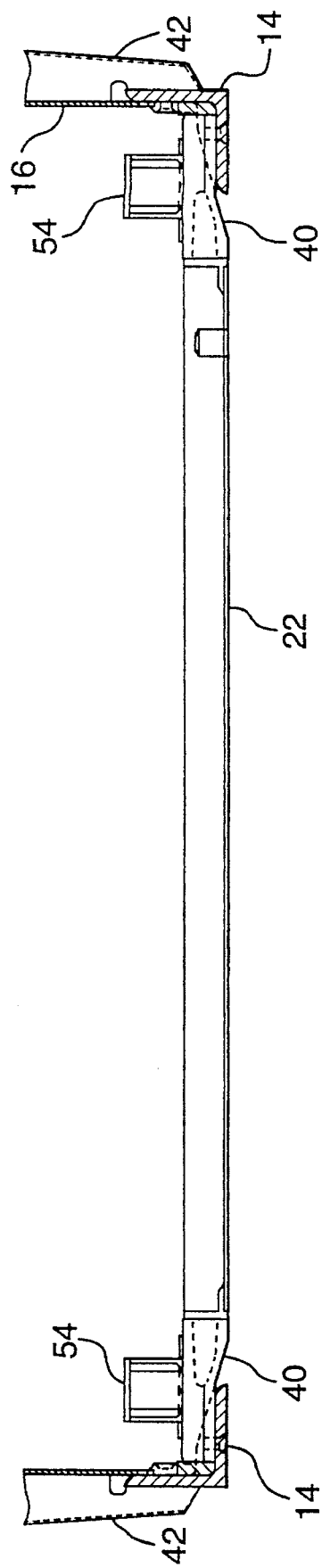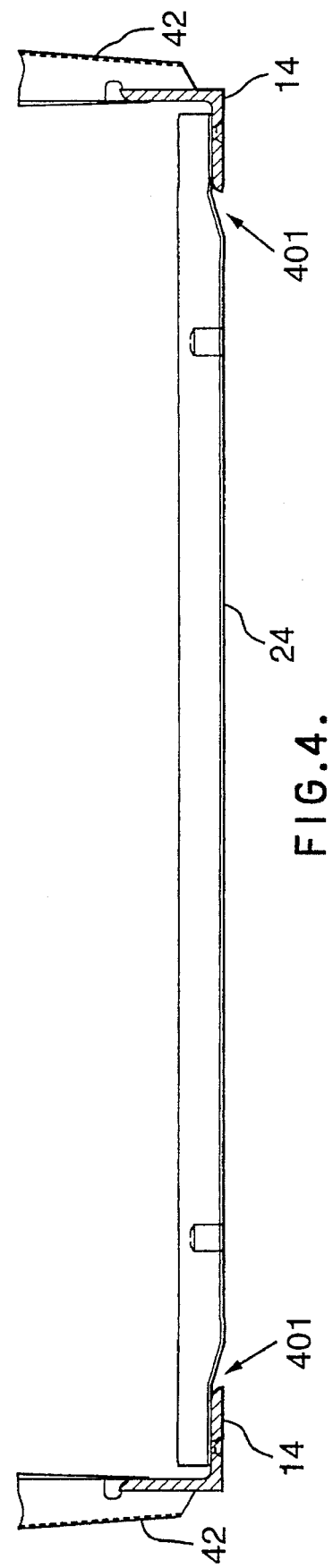

_5,501,556_

RETRACTABLE GUIDE ASSEMBLY FOR CHANGING THE EFFECTIVE WIDTH OF A RAILROAD FREIGHT CAR CONTAINER WELL

This application is a divisional application of U.S. Ser. No. 08/225,383 filed Apr. 8, 1994 pending.

FIELD OF INVENTION

This invention relates to a retractable guide assembly for changing the effective width of a railroad freight car designed to carry intermodal cargo containers.

BACKGROUND OF INVENTION

Intermodal cargo containers are standardized in various lengths such as 20, 24, 40, 45, 48 and 53 ft. The standardized cargo containers are regularly stacked one on top of another on a railway freight car for transport.

The ever increasing demand to increase the payload of railway cars and commercial competitiveness has forced manufacturers to design lighter railway cars which can still safely withstand the various dynamic forces which act upon the cargo containers during transport.

U.S. Pat. No. 4,599,949, discloses a light weight container car. The container car comprises a pair of longitudinally extending side sills of double web construction welded to a plurality of transverse beams and cross beams for strengthening the side sills from lateral deflection. Two cross beams are welded to a centered pad and extend between adjacent transverse beams.

U.S. Pat. No. 4,771,706, discloses a container carrying railroad car with supporting castings. The car body has opposing side walls and end walls defining a well in which a container can be received. The supports for the bottom of the container within the well has a plurality of metal castings joined to each side wall. Each casting has a substantially vertical leg joined to an exterior stiffener on the side wall and an arm extending substantially horizontally inward under the side chord or angle towards the center of the car on which a container bottom can be supported.

U.S. Pat. No. 4,909,157, discloses a railway car having a plurality of spaced metal castings joined to each side wall. Each casting has an L-shape with the vertical leg joined at the bottom the side wall to an exterior stiffener and the arm of the casting extending laterally horizontally inwardly under the side bottom chord or angle to aid in supporting a container in the well.

In order to stack two cargo containers, the railroad car must have a well to carry the two stacked containers as low as possible to meet the height restrictions of the rail system. The load bearing surfaces are generally vertically offset from the support points and the coupling points of the railroad car. As a result, unbalanced moments are created which must be counterbalanced with an opposite moment.

U.S. Pat. No. 4,599,949 discloses an end bulkhead joined to the side sills. The bulkhead has a plurality of strengthening baffles.

U.S. Pat. No. 4,807,722, discloses a railway car wherein each end of the car has a stub sill knee to transfer loads from the coupling to a lower horizontal shear plate in the well area which can collect snow which must be cleared before loading the car.

Although these patents effectively counterbalance the unbalanced moments, the structure has not been fully satisfactory.

Intermodal cargo containers are also standardized in terms of width. A cargo container can have either a 96 inch or 102 inch width. A well of a railroad freight car is generally manufactured to receive the larger width container. However, if a narrower width container is loaded into the wider well, the narrower container is prone to overturn within the container well. Retractable guides have been proposed to effectively narrow the width of the container well.

U.S. Pat. No. 4,754,709, discloses a railroad car for carrying a container. The car body has opposing side walls having guides mounted along each side for reducing the width of the wells spaced therebetween so as to center in the well, a container having a width less than the well width so as to limit sideward movement of the container in the well when the car rocks. However, such guides must be deployed prior to the container being deposited in the well, since the guide pivots through a space which is occupied by the container after it has been deposited in the well.

U.S. Pat. No. 4,930,426, discloses a device for changing the effective width of a container well of a freight car. A guide body is slid laterally inwardly and locked in the inner position for guiding a narrower container. A latch comprising a bar and aperture is used to lock the guide body in either the inner or outer position. However, the latch is prone to jam with ice under freezing conditions and therefore will lock in a particular position.

SUMMARY OF THE INVENTION

The disadvantages of the prior art may be overcome by providing a retractable guide assembly which is deployable regardless of whether a cargo container has been loaded and which is not prone to rust or jam.

According to one aspect of the invention, there is provided a retractable guide assembly for a changing the effective width of a container well of a railroad freight car comprises a housing having a pair of spaced apart walls, each having an inverted U-shaped slot, and a guide for slidably mounted between the walls for translational movement relative to the housing. The guide is slidable between a retracted position and an extended position in which a portion of the guide projects beyond the housing. The guide has a bar for extending through each slot of the walls for travelling therealong in a cam relationship as the guide slides between the retracted position and extended position.

According to another aspect of the invention, there is provided a retractable guide assembly for attachment to an upper edge of a wall of a railroad car. The retractable guide assembly comprises a housing and a guide. The housing has a base and a pair of spaced opposed walls mounted on the base. Each wall has a matching, inverted generally U-shaped slot with downwardly depending slot arms, one of which is angled away from the other and the other has a basal abutment. The guide is slidably mounted between the walls. The guide has a convex bumper face extending between the walls, a bar extending from the guide adapted for sliding trravel in each of the walls slots, and a downwardly depending protrusion formed below the convex bumper face. The convex bumper face is extendable beyond the housing by seating the bar in the slot arm having the basal abutment and is retractable by seating the bar in the slot arm angled away from the other.

According to another aspect of the invention, there is provided a retractable guide assembly for a changing the effective width of a container well of a railroad freight car. The guide assembly comprises a housing and a guide. The housing has a pair of spaced apart walls, each having an inverted U-shaped slot. The guide is pivotally mounted between the walls for rotational movement relative to the housing. The guide is pivotable between a retracted position and an extended position in which a portion of the guide projects beyond the housing. The guide has a radially extending slot and a bar slidable engaging the radially extending slot for reciprocal movement relative to an axis of rotation of the guide. The bar extends through each of the U-shaped slots of the walls for travelling therealong in a cam relationship. When the bar is in a radially inward position, the guide is pivotable between the retracted and extended positions and when the bar is in a radially outward position, the guide is restrained in either of the retracted and extended positions.

DESCRIPTION OF THE DRAWINGS

In drawings which illustrate embodiments of the invention,

FIG. 3 is a sectional view of a main transverse member of the railroad car of FIG. 1;

FIG. 4 is a sectional view of an intermediate transverse member of the railroad car of FIG. 1;

DETAILED DESCRIPTION OF THE INVENTION

Figure 1:
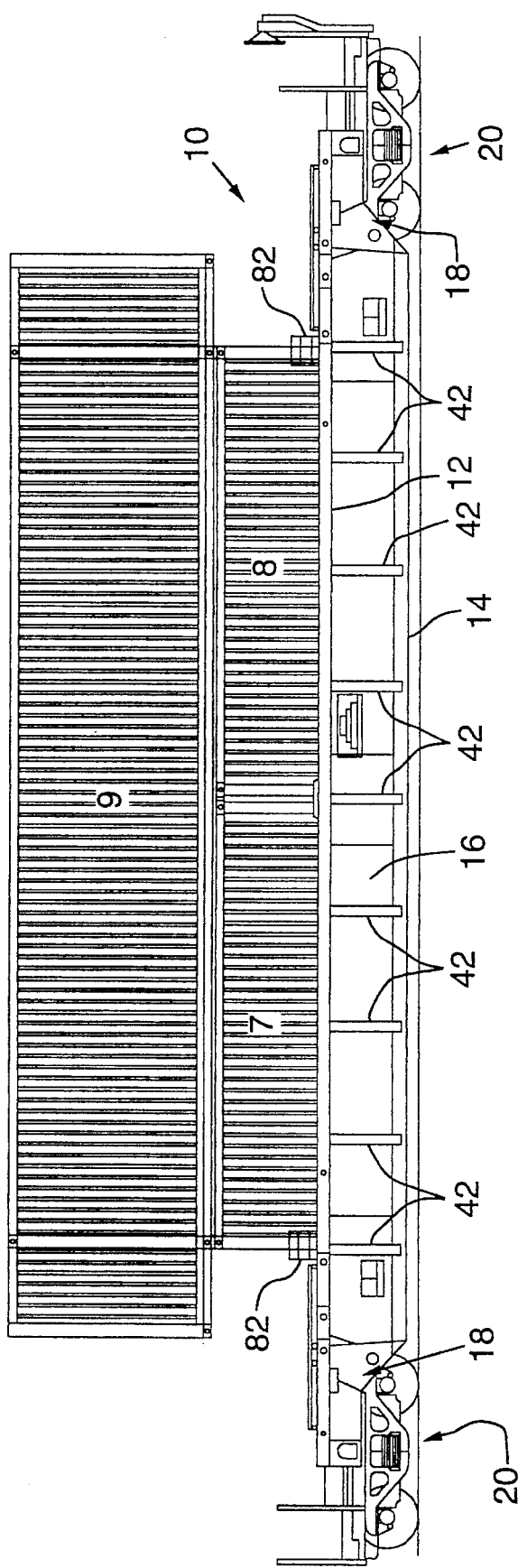
FIG. 1 is a side elevational view of a railroad car of the present invention loaded with stacked intermodal cargo containers.
Figure 12:
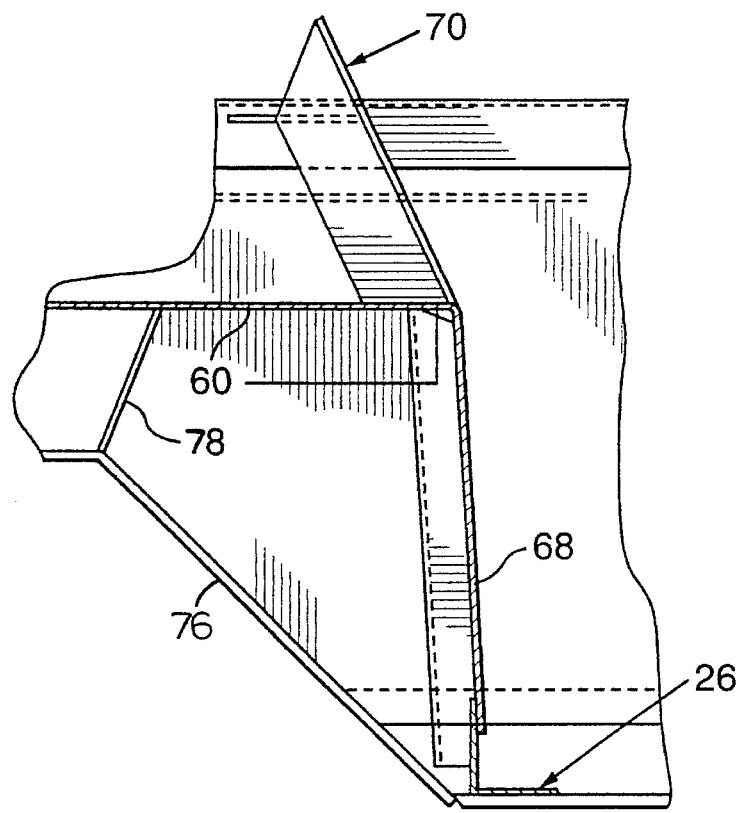
FIG. 12 is a side sectional view of the bulkhead portion of the end structure of FIG. 10 from the reverse angle.

The railroad freight car of the present invention is illustrated in FIG. 1 as 10. The freight car is constructed in accordance with standard practice, the car having a longitudinally extending load bearing frame structure formed by opposing side beams comprising top chords 12, bottom chords 14, side walls 16 and end structures 18. The frame structure is mounted at its ends on trucks 20 which run on tracks. The side walls 16 and bulkhead wall 68 (FIG. 12) define a well for receiving intermodal cargo containers 7, 8 and 9.

Figure 2:
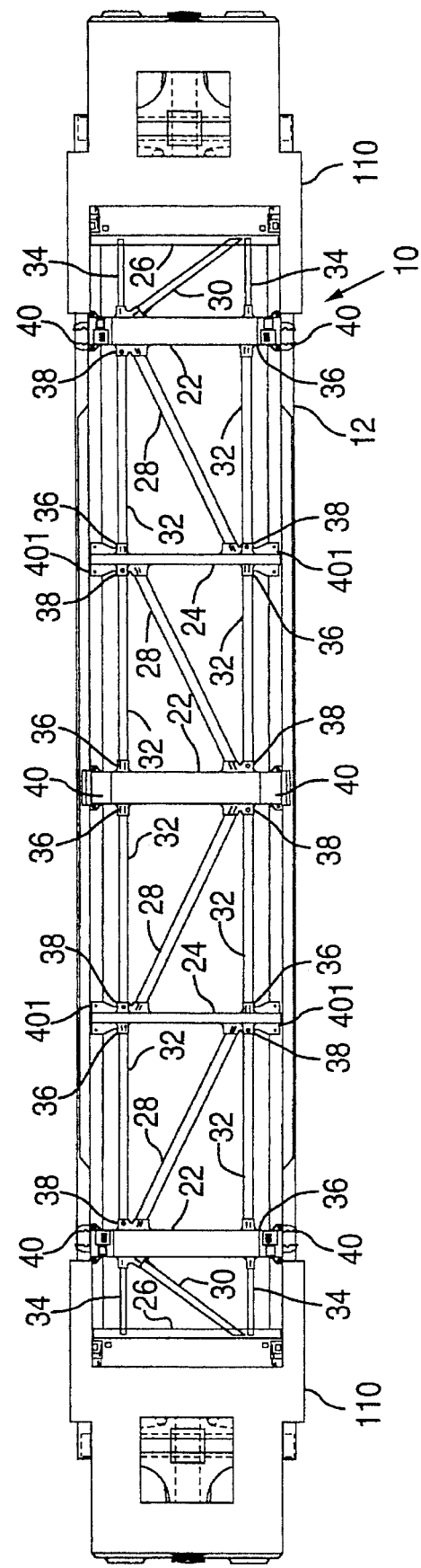
FIG. 2 is a top plan view of the railroad car of FIG. 1.
Figure 13:
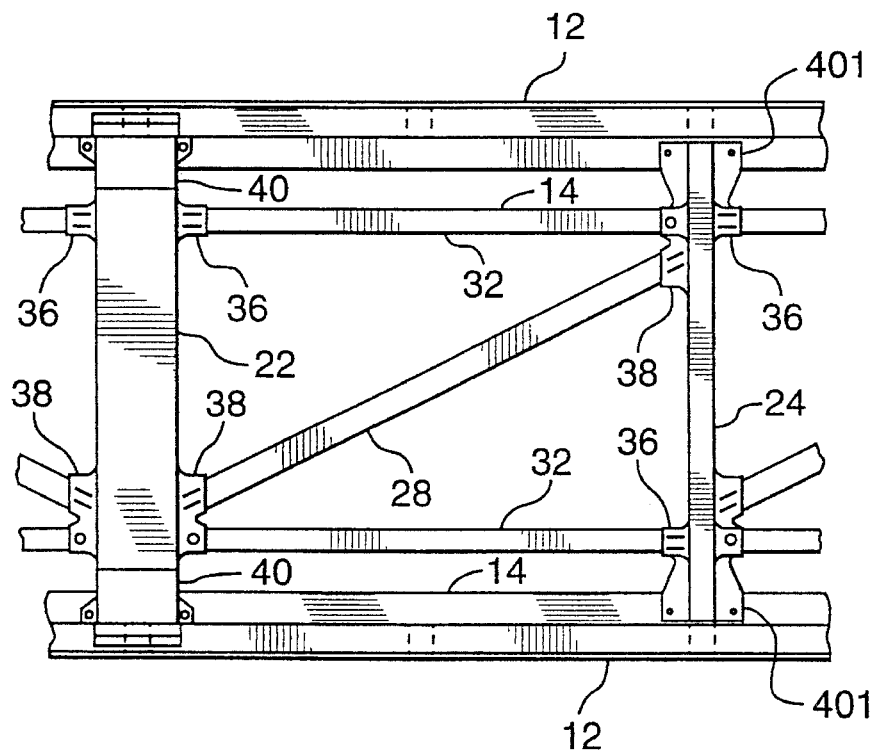
FIG. 13 is a detailed top plan view of a longitudinally inner section of the frame structure of FIG. 2.
Figure 14:
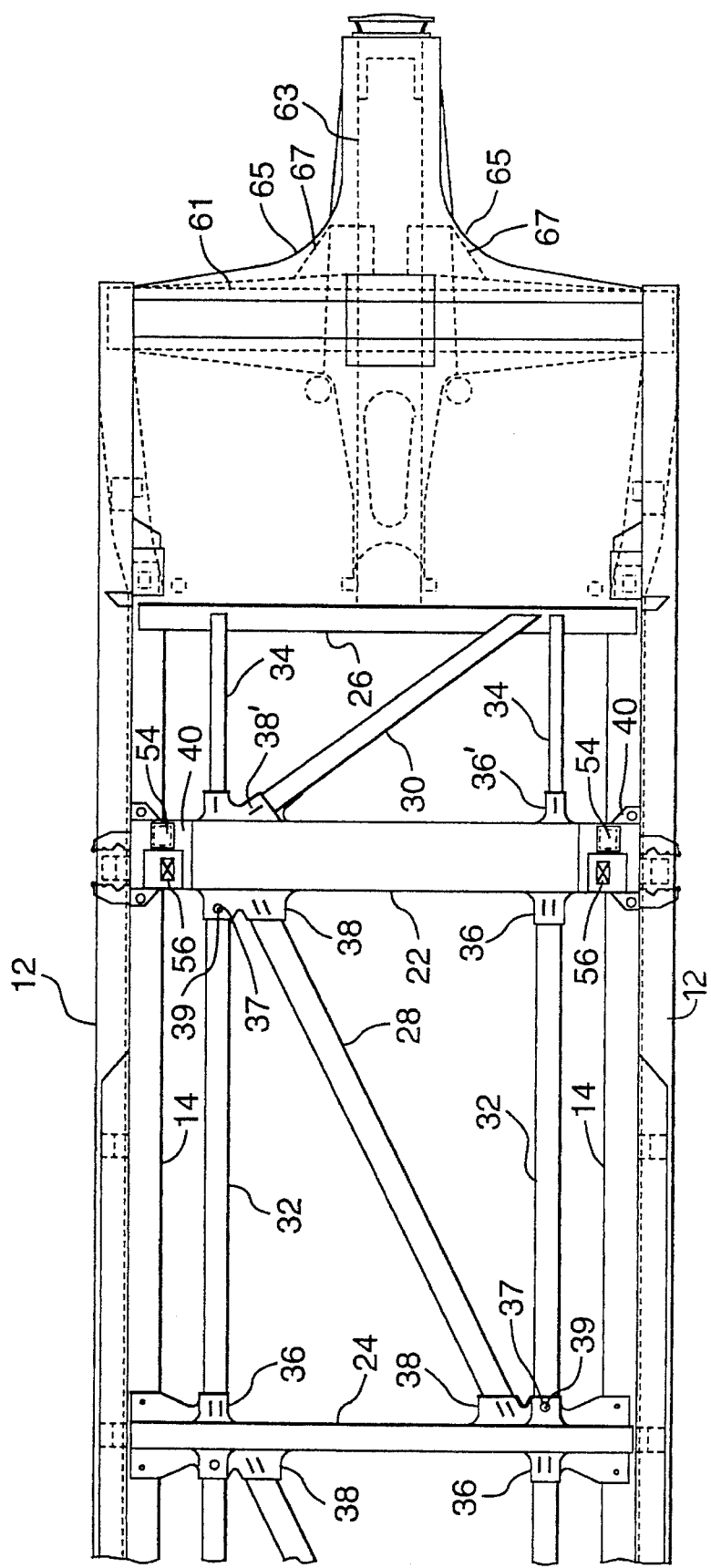
FIG. 14 is a detailed top plan view of a longitudinally outer section of the frame structure of FIG. 2.

Referring to FIGS. 2, 13 and 14, the floor of the well extends between bottom chords 14 and comprises load supporting transverse members 22, intermediate transverse members 24 and bottom end chords 26. Extending between adjacent transverse members are diagonal struts 28 and 30 which are symmetrical about the center transverse member 22. Diagonal struts 28 are approximately parallel to each other on one side of the center transverse member but symmetrically opposed on opposite sides of the center transverse member. Diagonal struts 30 extend opposite to the adjacent diagonal strut 28.

Since the floor of the well is open, safety regulations require that some support be provided in the event that the bottom of the cargo container falls out. Safety struts will support the cargo container load in such event.

Safety struts 32 and 34 extend longitudinally between transverse members 24 and end sills 26. One end of the safety strut 32 is rigidly mounted while the opposite end is slidingly mounted. In the preferred embodiment, safety struts 32 are welded into a bracket 36 at one end and pinned to bracket 38. The struts 32 have a slot at the pinned end and are so located that the strut receives no axial loads when the bottom chord 14 is strained. Pin 39 extends from the end of struts 32 and travels in the slot at the pinned end. As bottom cord 14 is strained, pin 39 is able to travel along the slot preventing axial loads from being transferred to struts 32. The welded end is thus protected from high fatigue loads. Both ends of struts 32 may be pin connected with some increase in strut weight.

Bracket 38 preferably receives both diagonal strut 28 and the pinned end of safety strut 32. Bracket 38' preferably receives both diagonal strut 30 and the end of safety strut 34. Bracket 38 and 38' and bracket 36 and 36' are identical except that bracket 38' and 36' are sized to receive the smaller diagonal strut 30 and safety strut 34, respectively.

The combination of opposed diagonal struts and transverse members produces a relatively light weight and rigid frame structure of the freight car.

Transverse members 22 and intermediate transverse members 24 are preferably connected to the bottom chord 14 by bolts. Preferably, each intermediate transverse member 24 is a hollow rectangular beam (FIG. 4) having a flange on each side thereof for bolting to the bottom chord 14.

In the preferred embodiment, bottom chord 14 is a 90° open corner angle having one arm welded to the side wall 16 which is welded to top chord 12. Top chord 12 is preferably a square or rectangular box beam. Extending between top chord 12 and bottom chord 14 perpendicular to side wall 16 are vertical side wall braces 42.

Figure 5:
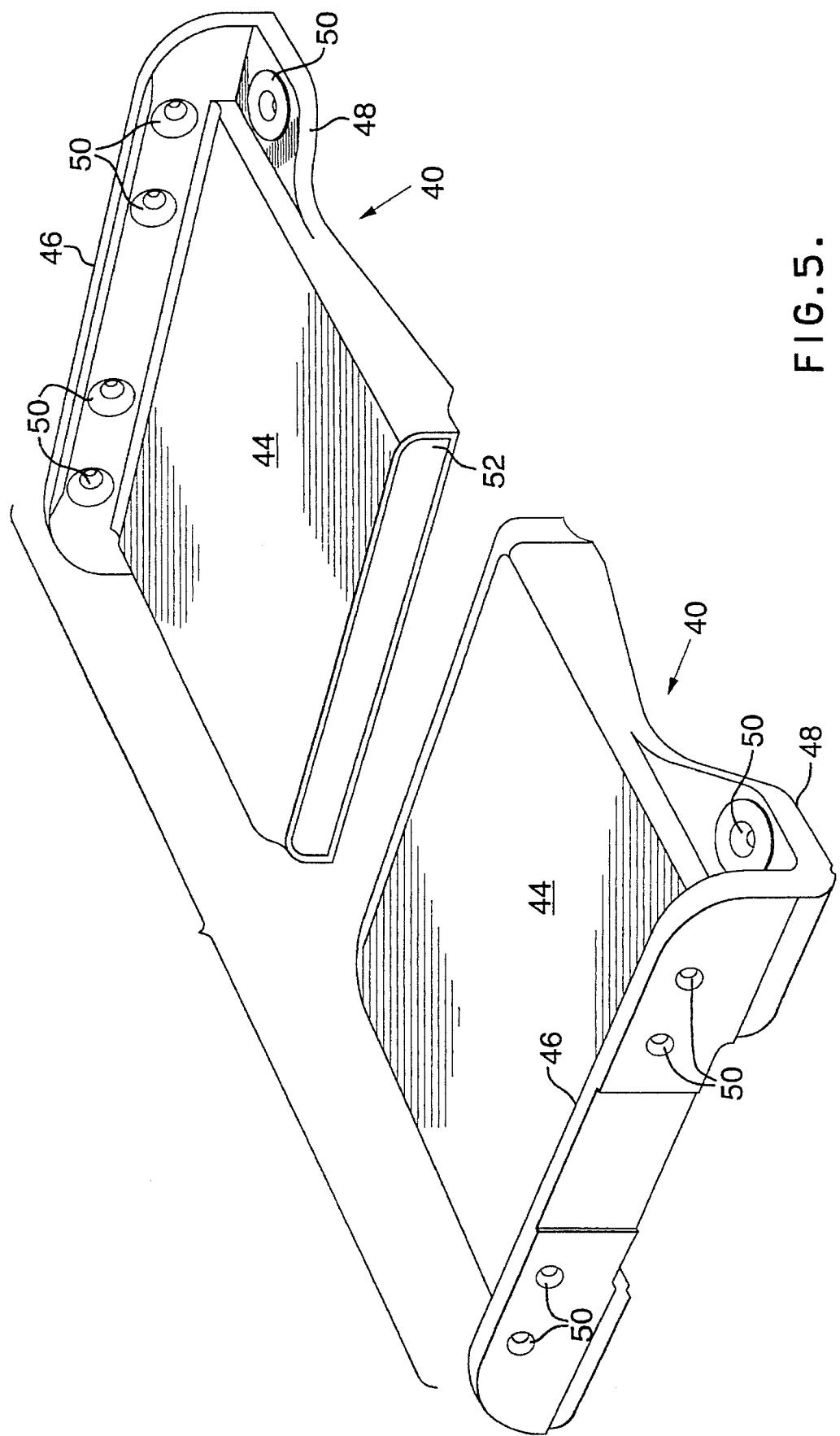
FIG. 5 is a perspective view of a pair of container support brackets for connecting the main transverse members of FIG. 3.
Figure 6:
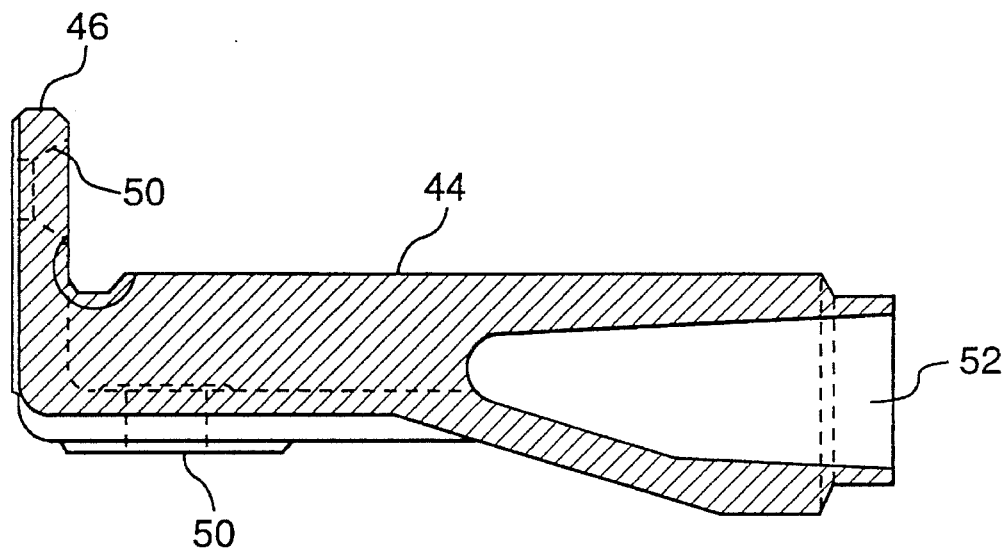
FIG. 6 is a transverse sectional view of the connecting bracket of FIG. 5.

Referring to FIG. 5, container support bracket 40 has a horizontal platform 44 having a flange 46 at one end extending perpendicular thereto and merging with a horizontal flange 48 on each side thereof. Flanges 46 and 48 have bolting holes 50 extending therethrough. The bolting holes in flange 40 are preferably countersunk. The end opposite the flange 46 is a hollow 52. The mouth of the hollow is narrowed to fit inside of hollow transverse member 22 and provide backing for a weld joint. Bracket 40 can be cast, forged or machined, but is preferably cast.

Figure 8:
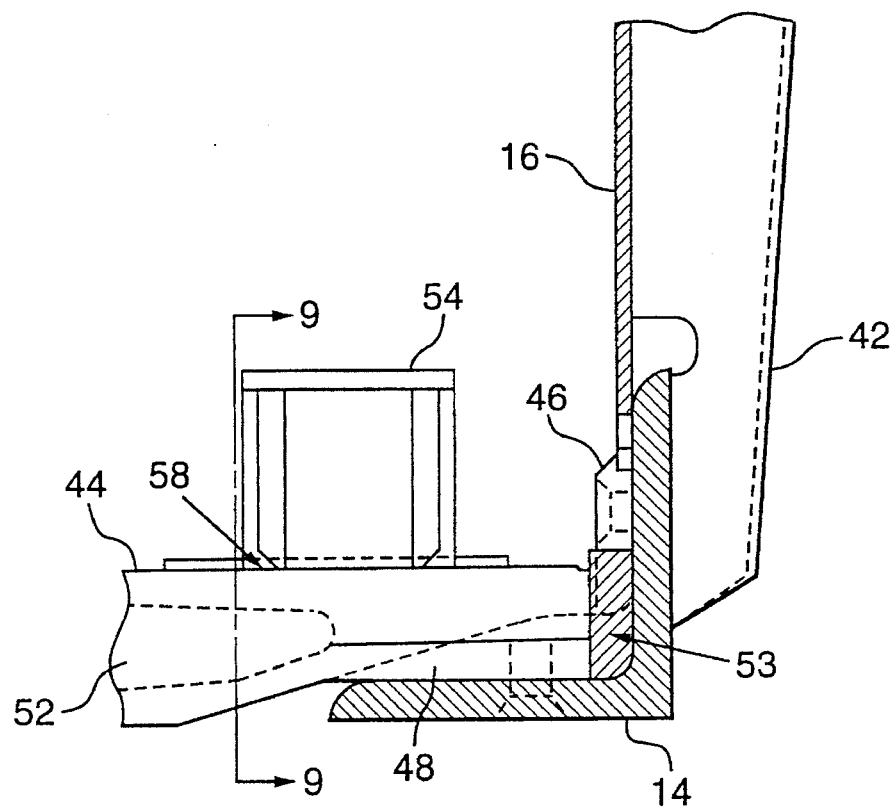
FIG. 8 is a transverse sectional view of the connection between the main transverse member, the container support bracket and the side wall of the railroad car of FIG. 1.

During assembly, transverse member 22 is welded to brackets 40 at each end thereof. Brackets 40 are then bolted to both the vertical and horizontal arms of bottom chord 14. An impact stop block 53 is mounted on the vertical arm of bottom chord 14 beyond the outer transverse members 22 (FIG. 8).

Figure 9:
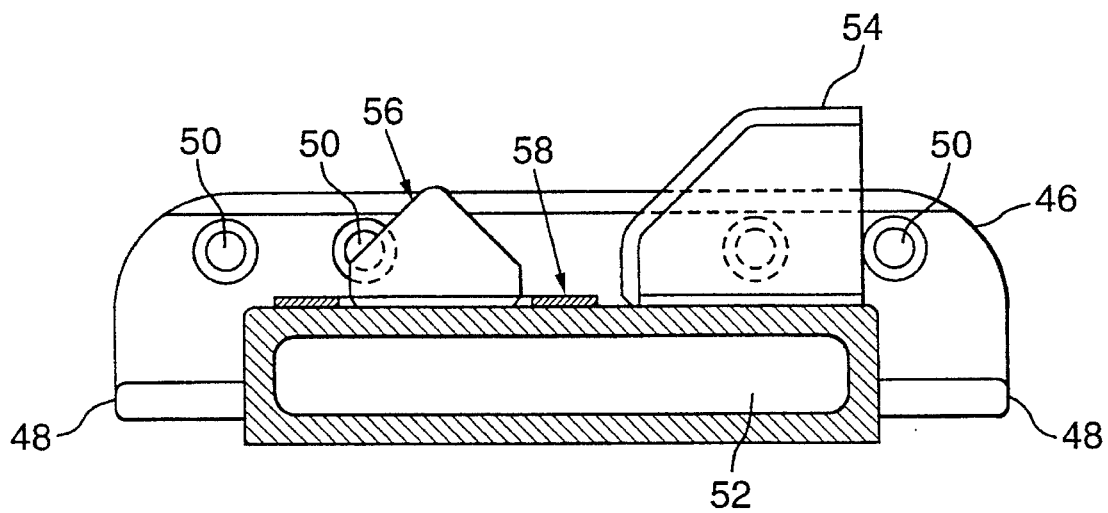
FIG. 9 is a sectional view of the container support bracket of FIG. 8 along the lines 9—9.
Figure 10:
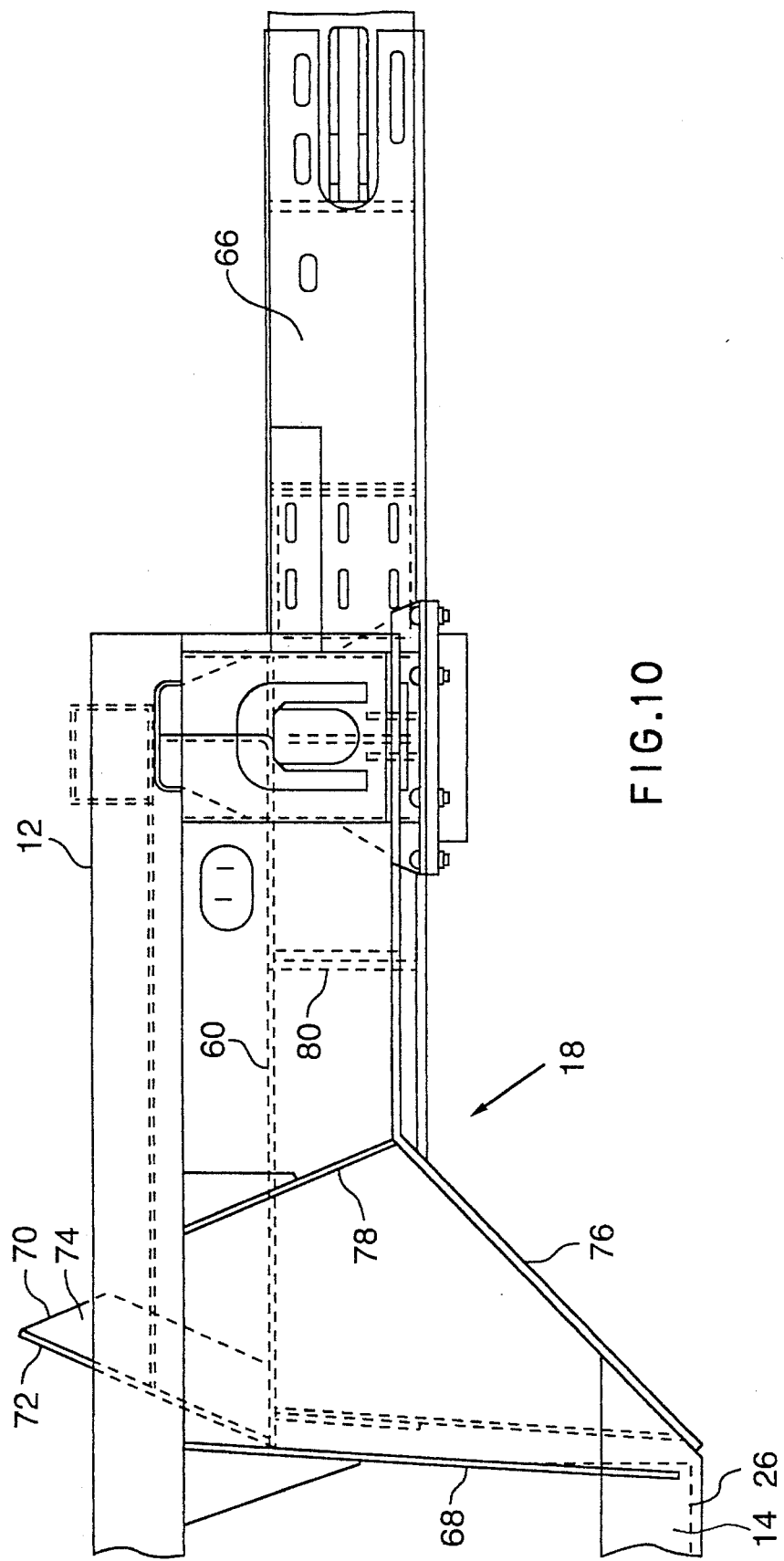
FIG. 10 is a side elevational view of the end structure of the railroad car of FIG. 1.
Figure 11:
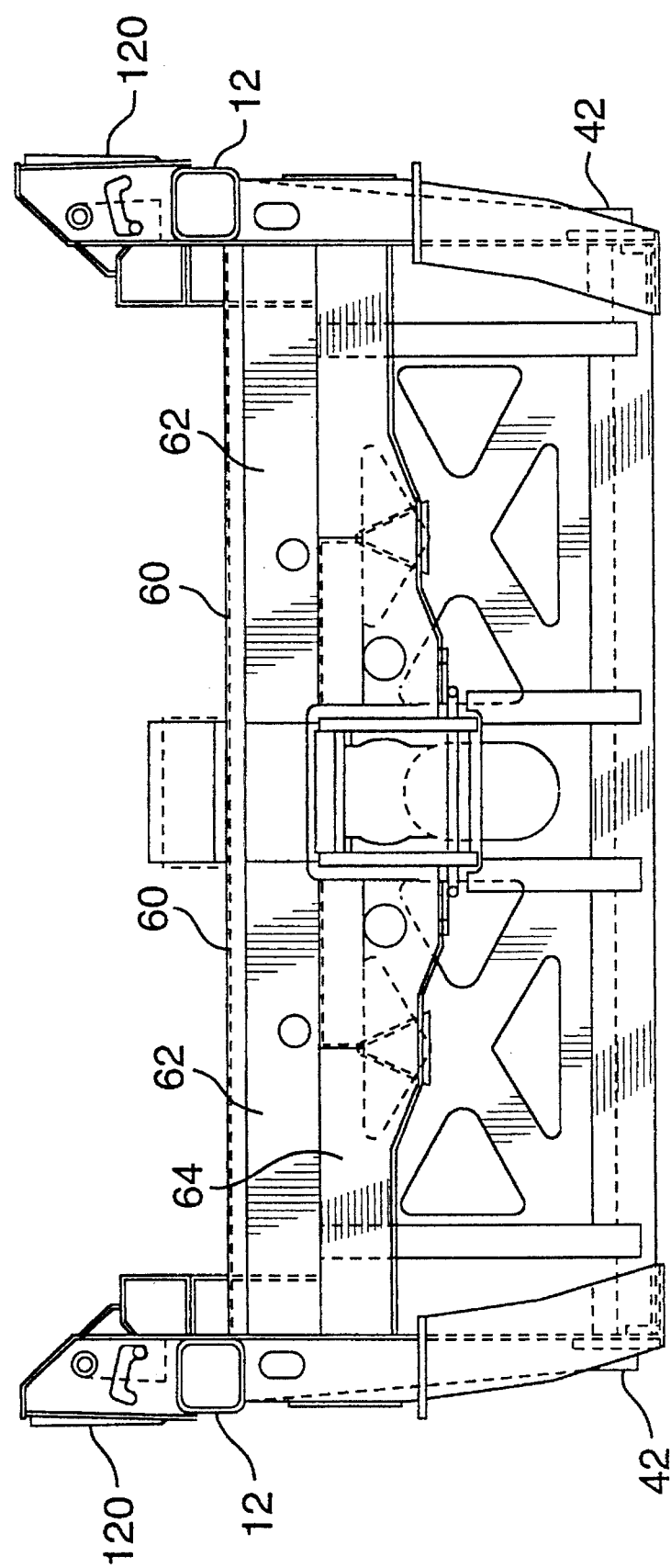
FIG. 11 is an end elevational view of the end structure of the railroad car of FIG. 1 illustrating a second embodiment of the retractable lateral guide.

On the brackets of the longitudinally outermost transverse member 22 is a container guide 54 and a locating cone 56 (FIG. 9). The spacing between cones and guides is the positioning distance of a standard cargo container to position the four corners of a cargo container within the well.

Referring to FIGS. 10, 11, 12 and 14, the end structures 18 are more particularly illustrated. Both end structures are identical; however, for simplicity only one end is illustrated. Top chord 12 extends from the well longitudinally outwardly to overlap the body bolster 64 under which the railroad truck means 20 is pivotally connected. Stub center sill 66 extends from the bulkhead wall 68 to the extreme end of the car. The stub center sill 66 is the main draft load connection between railroad cars. The connection can either be drawbars or standard couplings.

Extending between side walls 16 is shear plate 60 which forms the top surface of body bolster 64 and stub center sill 66. Optionally, an upper bolster 62 may be incorporated. Main bolster 64 is connected to side walls 16. Shear plate 60 is integrally connected to bulkhead wall 68 which is connected to bottom end chord 26 and side walls 16. Extending upwardly from shear plate 60 is fixed container guide assembly 70 which comprises a plate 72 and a perpendicular flange 74. Fixed guide assembly 70 protects the end structures 18 from damage during loading and unloading of the cargo containers.

The bottom flange 76 of side sill ends extends downwardly towards the bottom chords 14. Flange 78 reinforces the bend in flange 76.

The outer edge of the shear plate 60 is defined essentially by the body bolster outer webs 61 and the stub center sill webs 63 with a large transition curve 65 between the two lines. A diagonal stiffening member 67 is provided near the curved edge.

Figure 7:
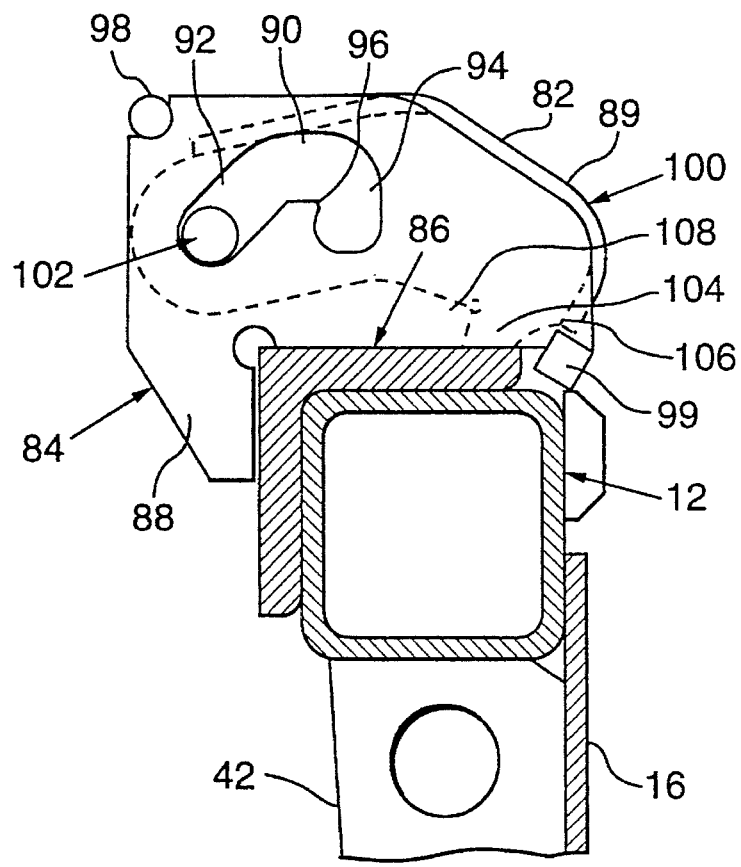
FIG. 7 is a transverse sectional view of the side wall of the railroad car of the present invention, illustrating a first embodiment of a retractable lateral guide in a retracted position.
Figure 17:
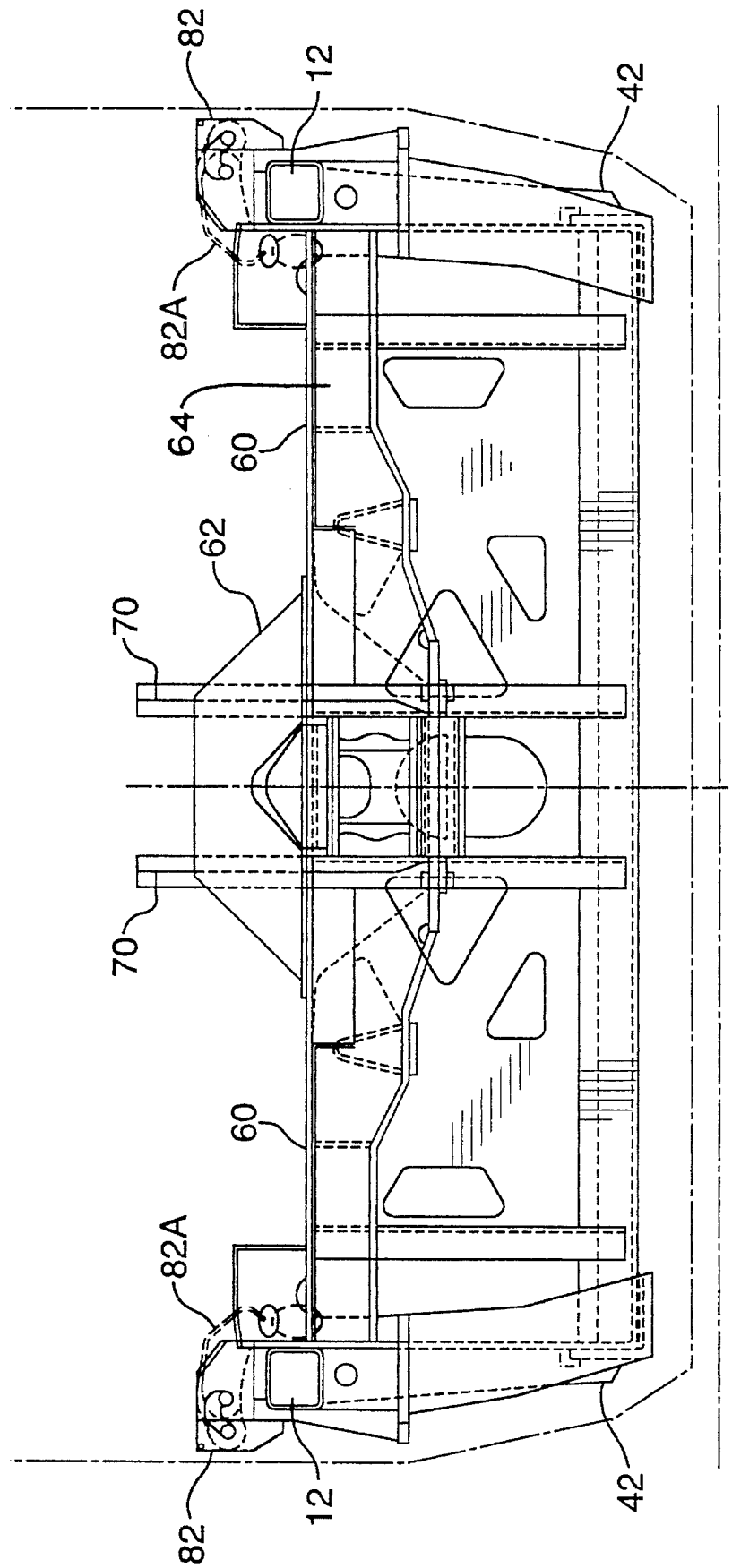
FIG. 17 is an end elevational view of the end structure of a railroad car of the present invention illustrating the retractable lateral guide of FIG. 7.

As illustrated in FIGS. 7 and 17, the retractable lateral guide assemblies 82 are shown in a retracted position (solid lines) and an extended position (broken lines 82a). Retractable guide assemblies 82 comprises a housing 84 having two side walls 88, a tie bar 98 and a fixed locking bar 99 to provide structural integrity. Each side wall 88 has a matching inverted U-shaped slot 90. One arm 92 of the slot is angled away from the other arm 94. At the base of arm 94 is a basal abutment 96. Bar 99 has a square cross section which is rotated presenting a detent.

Slidably extending between the two walls 88 is guide 100 which has two side walls connected by a contoured plate top and inner surface. In the preferred embodiment, guide 100 has a generally chevron shape presenting a bumper surface 89. The top plate of guide 100 has a hand hold aperture for gripping and moving the guide. Guide 100 has a bar 102 through the two side plates and extends outwardly therefrom for slidingly engaging slot 90 in a cam relationship. Guide 100 has a lower edge having a protrusion 104 defining two notches 106 and 108.

As illustrated in FIGS. 7 and 17, housing 84 is mounted onto the top of a side beam angular reinforcement 86 which is part of the top chord 12. A plurality of like lateral guides are spaced about the perimeter of the well of the freight car 10.

In a retracted position, bar 102 is slid towards the end of arm 92 of slot 90, whereby notch 106 will rest upon bar 99.

The length of arm 92 and notch 106 will stably retain the guide in a retracted position. To move the guide into an extended position, the operator may lift the guide 100 by the hand hold or push laterally on bar 102 and move the guide relatively transversely inwardly. Bar 102 will move along slot 90 into arm 94. Protrusion 104 will extend forwardly until notch 108 rests on bar 99. Abutment 96 will restrain the bar 102 from travelling transversely outwardly while fixed locking bar 99 will abut protrusion 104 stably retaining the guide in the extended position.

To retract the guide 100, the operator lifts the guide 100 by the hand hold to clear bar 99 and bar 102 out of slot arm 94, and then moves guide 100 laterally outward to the position in FIG. 7.

When the guides 100 are in the extended position the effective width of the well is reduced. Narrower cargo containers will abut against the guides. When the guides 100 are in the retracted position, wider cargo containers may be loaded into the well.

Figure 15:
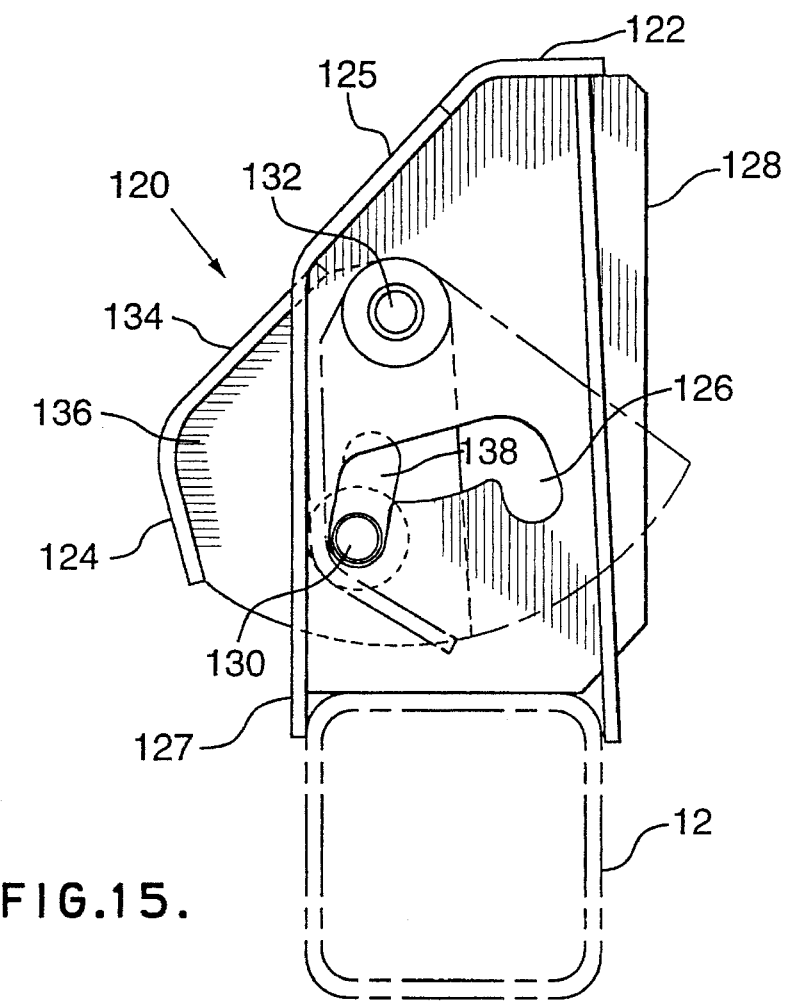
FIG. 15 is a transverse elevational view of the second embodiment of the retractable lateral guide.
Figure 16:
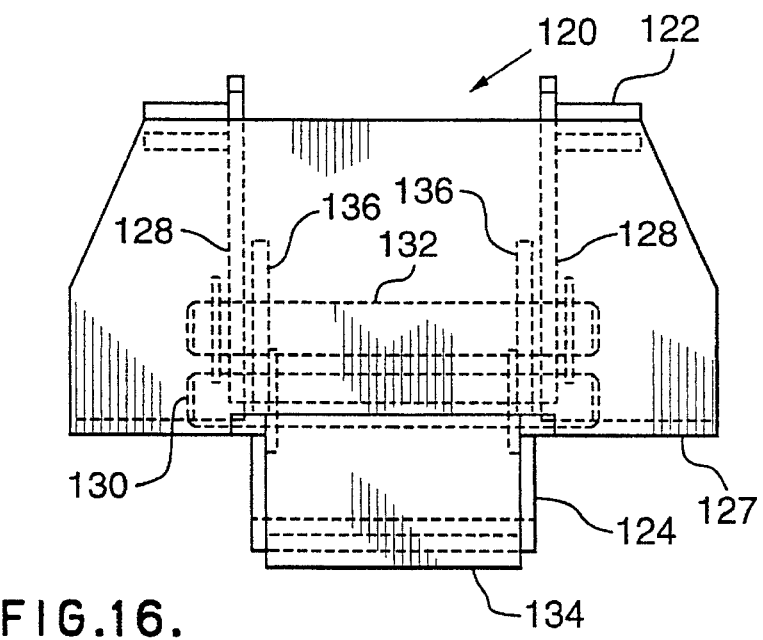
FIG. 16 is a top plan view of the retractable lateral guide of FIG. 15.

Referring to FIGS. 15 and 16, a second embodiment of a retractable guide assembly 120 is illustrated. Guide assembly 120 is mountable on the top chord 12 of a railroad freight car. Guide assembly 120 comprises a housing 122 and a pivotally mounted guide 124. Housing 122 has an open transverse outer face, a sloped face 125 and side walls 128. Each side wall 128 has an inverted U-shaped slot 126. Slot 126 is sized to slidably receive bar 130 which extends outwardly from guide 124.

Guide 124 has a pivot pin 132 which pivotally connects guide 124 to housing 122. Guide 124 has an offset shape such that when the guide is in an extended position as illustrated in FIG. 15, a bumper surface 134 is presented. Bumper surface 134 directs a container away from the side wall of car and effectively reduces the width of the well.

Guide 124 has side wall walls 136. Side walls 136 has a slot 138 radially extending from the axis of rotation of pivot pin 132 and sized to slidingly receive locking bar 130. Locking bar 130 reciprocally slides relative to pivot pin 132.

The inner corners of the U-shaped slot 126 are shaped so that when lateral forces are applied to the bumper surface 134 and the weight of the guide 124 will tend to force locking bar 130 to the remote ends of the U-shaped slot 126.

In use, the operator can slide locking bar 130 relative to pivot pin 132. In a position radially inwardly, guide 124 can pivot about the axis of rotation of pivot pin 132 between and extended position (solid lines) to a retracted position (broken lines) as locking bar 130 travels along slot 126. The operator then urges locking bar 130 to one of the remote ends of slot 126 locking the guide 124 in either the extended or retracted position.

When the guide 124 is in the extended position, the effective width of the well is reduced to retain narrower containers. If the container rocks, it will bear against the bumper surface 134 of guide 124.

When the guide 124 is retracted, the well is suitable for wider containers. Wider containers will also bear against bumper surface 134 or against the housing inner flange 127.

The retractable lateral guides of the first and second embodiment can be deployed and retracted before or after the narrower container has been installed. As the container bears against the bumper surface, the forces will tend to urge the locking mechanism into a locked or seated condition reducing the possibility of the lateral guides from releasing.

Additionally, the placement of the movable parts reduces the possibility of injuring the operator.

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

We claim:

1. A retractable guide assembly for changing the effective width of a container well of a railroad freight car, said guide assembly comprising, a housing having a pair of spaced apart walls, said walls each having an inverted U-shaped slot, a guide slidably mounted between said walls for translational movement relative to said housing, said guide slidable between a retracted position and an extended position in which a portion of said guide projects beyond said housing, said guide having a bar for extending through each slot of said walls for travelling therealong in a camming relationship as said guide slides between the retracted position and extended position.

2. A retractable guide assembly as claimed in claim 1 wherein said housing has a base having an abutment and said guide has a bottom surface having a protrusion defining two notches on each side thereof, whereby said abutment will engage one of said notches when said guide is in either the retracted position or the extended position.

3. A retractable guide assembly as claimed in claim 1 wherein said slot is biased to lock said guide when in said extended position.

4. A retractable guide assembly as claimed in claim 1 wherein said slot has a basal abutment biasing said guide in the extended position.

5. A retractable guide assembly as claimed in claim 4 wherein said guide has a bumper surface for directing cargo containers away from said retractable guide assembly.

6. A retractable guide assembly as claimed in claim 5 wherein said walls are mounted on a base forming a detent between said walls for engagement with a protrusion of said guide when said guide is in either the retracted position or the extended position.

7. A retractable guide assembly as claimed in claim 6 wherein each of said U-shaped slots of said walls has downwardly depending slot arms, one of which is angled away from the other.

8. A retractable guide assembly for attachment to an upper edge of a wall of a railroad car, said guide assembly comprising a housing having a base and a pair of spaced opposed walls mounted on said base, each wall having a matching, inverted generally U-shaped slot with downwardly depending slot arms, one of which is angled away from the other, and the other of which has a basal abutment, a guide slidably mounted between said walls, said guide having a convex bumper face extending between said walls, a bar extending from the guide adapted for sliding travel in each of the walls slots, and a downwardly depending protrusion formed below said convex bumper face, said protrusion slidably engaging said base, whereby said convex bumper face is extendable beyond the housing by seating the bar in each of the slot arms having the basal abutment and is retractable by seating the bar in each of the slot arms angled away from the other slot arms.

* * * * *